United States Patent
Gehrke

[11] 3,937,312
[45] Feb. 10, 1976

[54] RETAINER FOR ROLLER CLUTCH
[75] Inventor: Gerard William Gehrke, Litchfield, Conn.
[73] Assignee: The Torrington Company, Torrington, Conn.
[22] Filed: Oct. 4, 1974
[21] Appl. No.: 512,345

[52] U.S. Cl. .............................. 192/45; 188/82.84
[51] Int. Cl.² .......................................... F16D 3/34
[58] Field of Search ............. 192/45, 35; 188/82.84

[56] References Cited
UNITED STATES PATENTS

| | | | |
|---|---|---|---|
| 3,260,333 | 7/1966 | Benson et al. | 192/45 |
| 3,339,687 | 9/1967 | Cowles | 192/45 |
| 3,404,760 | 10/1968 | Benson et al. | 192/45 |
| 3,500,977 | 3/1970 | Gehrke | 192/45 |
| 3,799,306 | 3/1974 | Rist | 192/45 |

Primary Examiner—Samuel Scott
Assistant Examiner—Randall Heald
Attorney, Agent, or Firm—Frank S. Troidl

[57] ABSTRACT

The retainer is entirely made of resilient molded plastic. A plurality of molded plastic bars interconnect a pair of axially spaced rims. A molded plastic spring is connected to each of a plurality of the bars at a point adjacent one rim. The springs extend angularly from said one rim toward the other rim.

The rims, bars, and springs are one integral molded plastic unit.

6 Claims, 6 Drawing Figures

3,937,312

RETAINER FOR ROLLER CLUTCH

This invention relates to overrunning clutches. More particularly, this invention is a new retainer for use with an overrunning clutch.

Currently made resilient plastic retainers are in general made by either an "axial draw" method or a "radial draw" method. In the axial draw method, a mold or die is used which essentially has only two relatively moving parts which move parallel to the center line of the retainer. The radial draw method uses a mold or die with separate parts which must spread out radially from the center line of the retainer while the main halves of the mold move axially. The radial draw type mold is very expensive, has many more working parts than the axial draw mold with the resulting greater chance for error in manufacture, possibility of damage, and plastic "flash" on the molded cage.

This invention is a novel overrunning clutch retainer which is made by the axial draw method. Briefly described, the retainer comprises a first molded plastic rim and a second molded plastic rim axially spaced from the first rim. The inside diameter of the second rim is greater than the inside diameter of the first rim. Circumferentially spaced molded plastic bars interconnect the two rims forming roller pockets. A molded plastic spring is connected to each of a plurality of the bars at point adjacent the second rim. The spring extends angularly toward the first rim. The rims, bars, and springs are one integral unit. Each spring is adapted to be pressed toward its corresponding bar when a roller is placed in the corresponding pocket of the retainer so that each spring exerts a force against the corresponding roller.

The invention, as well as its many advantages may be further understood by reference to the following detailed description and drawings in which.

In the various figures, like parts are referred to by like numbers.

Figure 1:
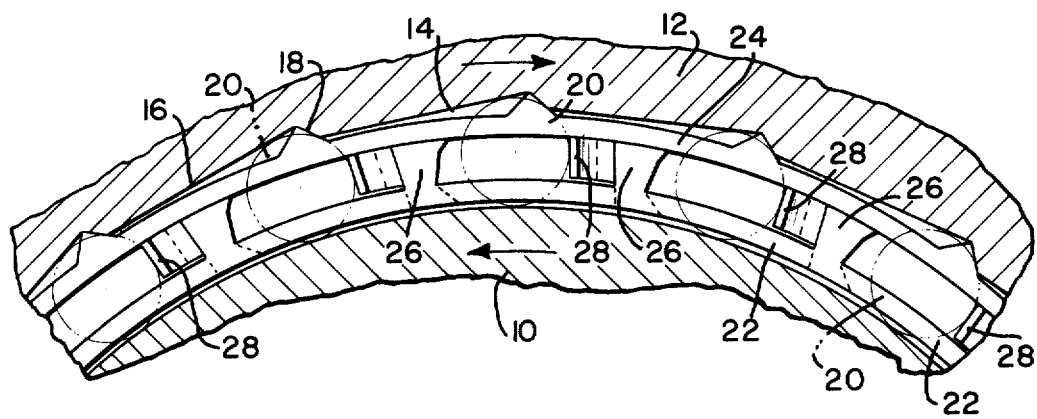
FIG. 1 is a sectional view showing my new molded plastic retainer assembled in an overrunning clutch.

Referring to the drawings, and more particularly to FIG. 1, a fragmentary sectional view of an overrunning clutch is shown. The overrunning clutch includes an inner member such as a rotatable shaft 10 and an outer member such as housing 12 having a greater inside diameter than the diameter of the shaft 10, thus providing a space 14 between the shaft and the housing.

In the embodiment of FIG. 1, a plurality of ramps 16 with stops 18 is formed on the inner periphery of the housing 12. A roller 20 is provided in the space 14 with one roller for each ramp 16. For clutching applications involving ligher torque loads, some rollers may be omitted.

The diameter of each roller 20 is less than the space between the shaft 10 and the housing 12 adjacent a stop 18. However, the diameter of each roller 20 is greater than the space between the housing and the shaft at a point on ramp 16 circumferentially spaced from the corresponding stop 18.

The springs urge the rollers circumferentially into contact with the ramp surfaces on the bore of the housing and the shaft outer surface. If the shaft should be moved in a counterclockwise direction or the housing moved in a clockwise direction, looking at FIG. 1, the rollers wedge between the shaft and housing, locking the two members together. The shaft and housing then rotate or remain stationary, as a unit. Rotating either member in the opposite direction relative to the other member unlocks the members.

Figure 2:
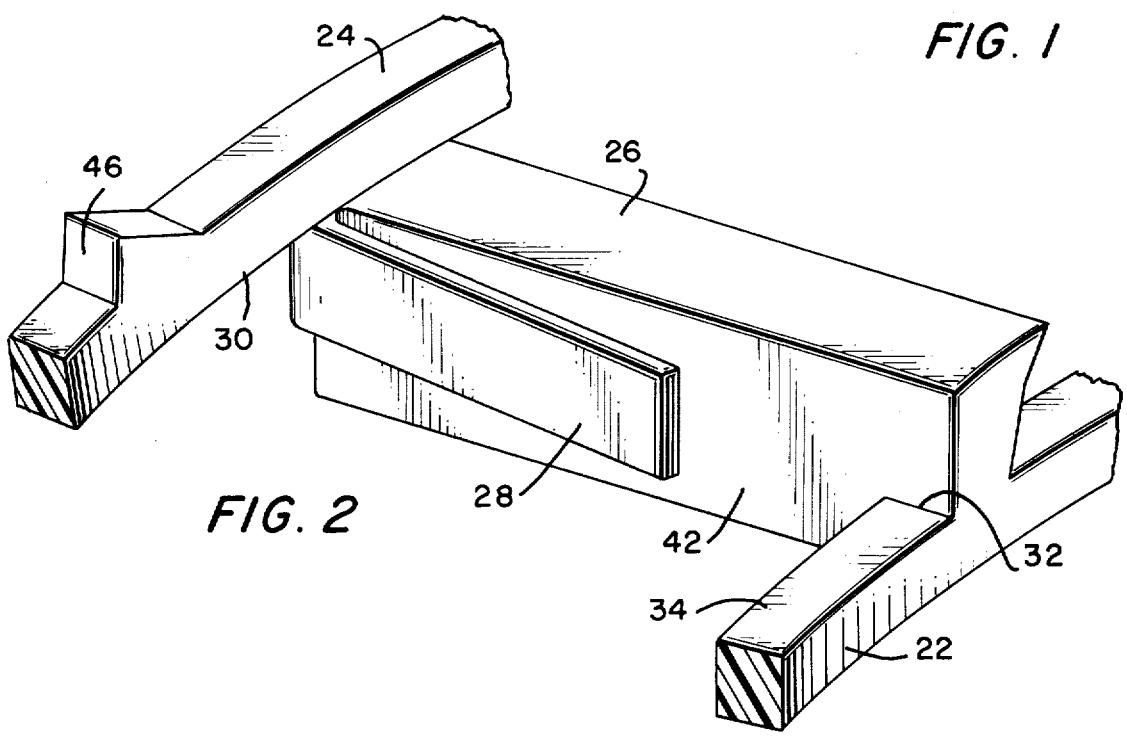
FIG. 2 is a perspective view on an enlarged scale showing a preferred embodiment of my new retainer.
Figure 3:
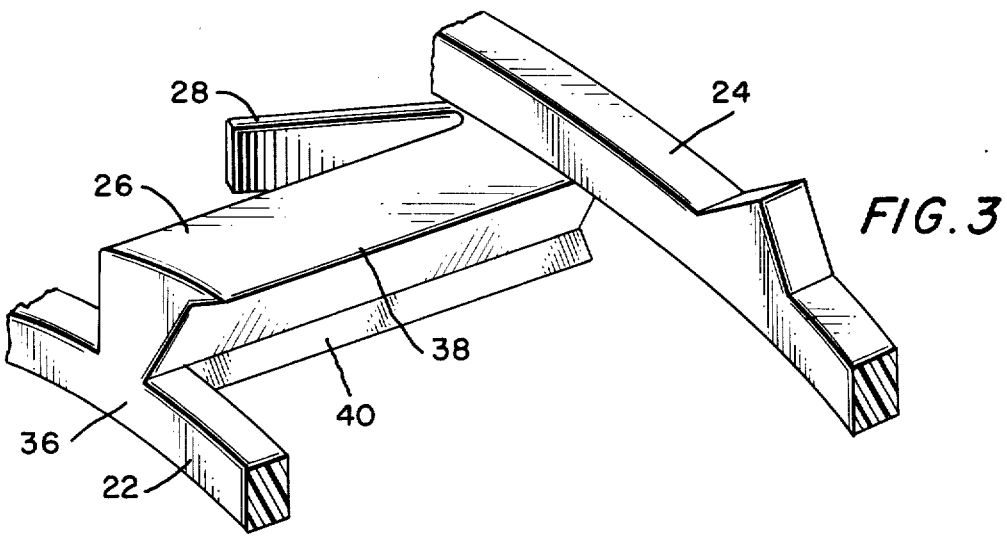
FIG. 3 is a different perspective view of the embodiment of FIG. 2.

My overrunning clutch retainer is a novel molded plastic structure which is made by an axial draw-type method. To allow the axial draw method to be used, the various parts of my new retainer are apportioned a predetermined radial part of the space 14 between shaft 10 and housing 12. In the embodiment of FIGS. 1 through 3, a first molded plastic rim 22 takes up approximately the radial inner one-third of the space 14. A second molded plastic rim 24 axially spaced from rim 22 takes approximately the radially outer one-third of the space 14. The bar 26 may take up approximately two-thirds of the radial space 14. Of course, various different proportions of the space 14 may be taken up by the rim 22, bar 26, and rim 24. However, to permit the making of the retainer by the axial draw method, the first rim 22 takes up the inner radial portion of space 14, the rim 24 takes up the outer radial portion. The bar 26 may take any portion of, or all of radial space 14. The rim 24 has a greater inside diameter than the inside diameter of the rim 22. Preferably, the inside diameter of rim 24 is also larger than the outside diameter of rim 22, though these two diameters may be substantially equal. Adjacent bars 26 form a roller pocket in which a roller 20 is placed.

A molded plastic spring 28 is integrally connected to each of a plurality of the bars 26 at a point adjacent the rim 24 and is preferably integral with both its corresponding bar 26 and the rim 24. The inside diameters of the springs are at least as large as the outside diameter of rim 22.

The spring 28 extends angularly from near or at rim 24 toward the rim 22 and up to a point approximately half-way across the axial space between rims 22 and 24. Thus, when a roller 20 is placed in a pocket, the spring 28 is moved circumferentially toward its corresponding bar 26. Thus, a spring bias is exerted against the roller by the spring 28.

In the embodiment of FIGS. 1 through 3, the force exerted by the spring 28 is along the approximate longitudinal center portion of the corresponding roller 20.

A portion of the bar 26 may extend under the inner periphery 30 of rim 24 or only to the inner axial end of rim 24. A portion of the spring 28 may extend under periphery 30. The outside edge of the portion of bar 26 extending under rim 24 and the outside edge of spring 28 may be along the same radial plane as the outside edge of rim 24, or axially inward from that plane or axially outward from that plane.

A portion 32 of each bar 26 may extend over the outer periphery 34 of rim 22. The outside edge of portion 32 may be along the same plane as the outside edge of rim 22. Alternatively, the end of bar 26 may be axially inward from the outside edge of rim 22, and it may stop at the inside surface of the end rim, or it may extend axially outward from the end rim.

On one side of each bar 26, there are provided lips 38 and 40 which are adapted to retain the rollers 20 in a pocket when the rollers are urged toward those lips by the spring. The other side 42 of each bar 26 may be flat and extend substantially radially from its inner edge to its outer edge. It may be a curved or stepped surface, and it may have a roller-retaining lip.

Figure 4:
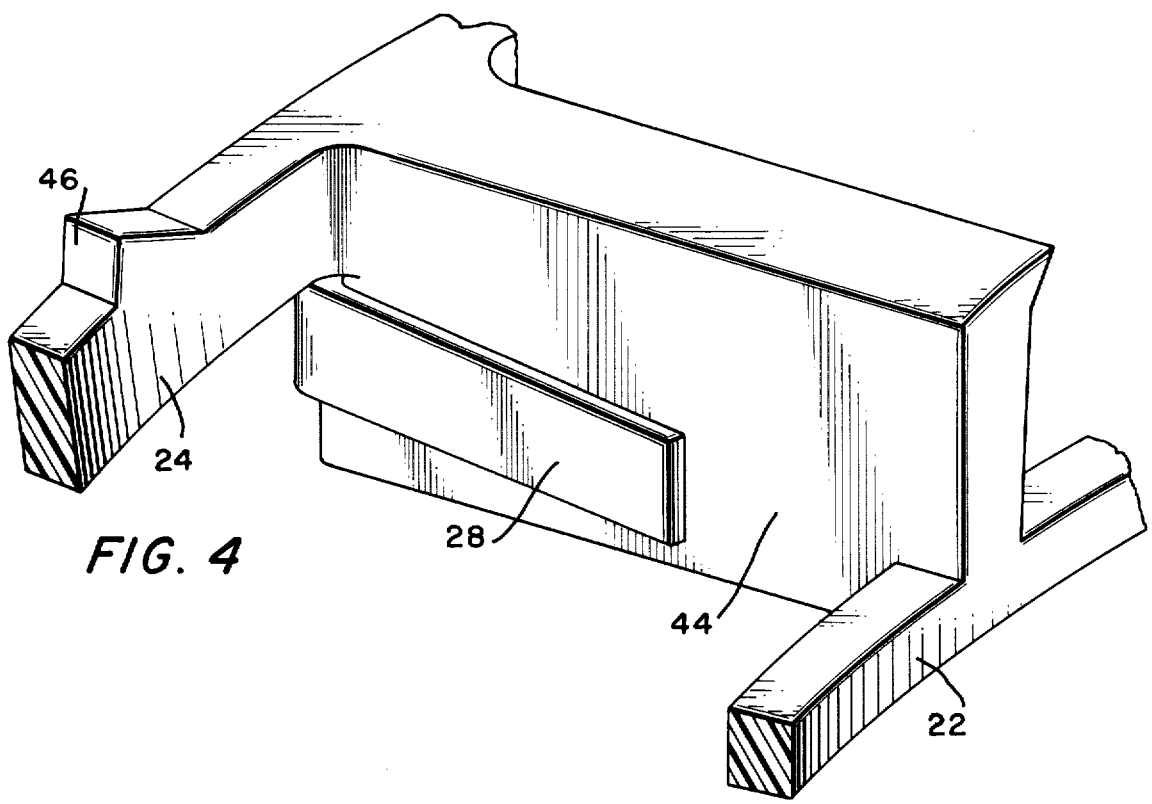
FIG. 4 is a perspective view similar to FIG. 2 showing another preferred embodiment of my invention.

In the embodiment shown in FIG. 4, the inside diameter of the bar 44 is substantially the same as the inside diameter of rim 22; and the outside diameter of the bar is substantially the same as the outside diameter of the rim 24. The spring structure 28 of FIG. 4 is substantially the same as the spring structure of the embodiment shown in FIGS. 1 through 3.

The locking tabs 46 on rim 24 may be any shape which will properly circumferentially position the retainer to locate the rollers and to give the proper spring action against the rollers 20 when the clutch is in operation.

Figure 5:
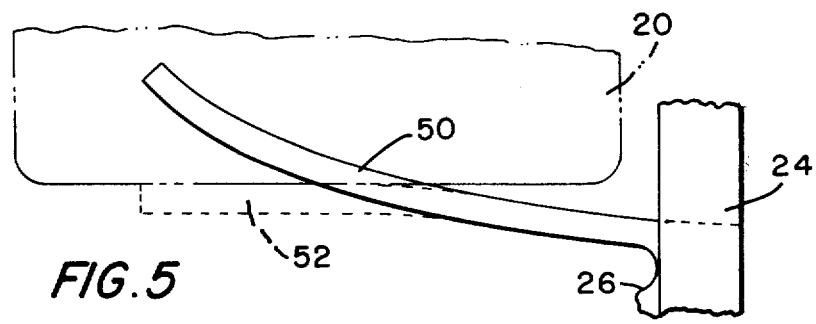
FIG. 5 is a fragmentary view of another preferred embodiment of my invention.

A second preferred embodiment of spring is illustrated in FIG. 5. In FIG. 5, the preassemble position of the spring 50 is shown in full lines, and the assembled position shown by broken lines 52 when the roller is in its rearmost circumferential position. The spring 50 may be rectangular in cross section, but is bowed in a circumferential direction away from the corresponding bar 26. When the roller 20 is inserted in the retainer pocket, the spring 50 is pressed toward the corresponding bar 26 toward the position shown by broken line 52. Note that the circumferential force exerted against roller 20 by the spring is along substantially the entire length of the spring at this rearmost position. At an intermediate operating position, a lesser length of spring will be in contact.

Figure 6:
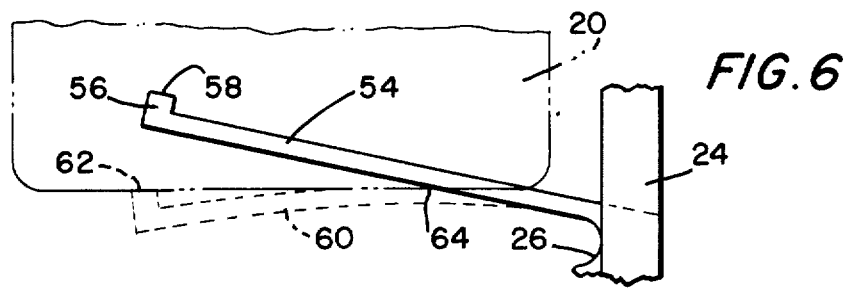
FIG. 6 is a view similar to FIG. 5 showing still another preferred embodiment.

In the embodiment shown in FIG. 6, the spring 54 has extending substantially perpendicularly from its outer end a portion 56. Portion 56 has a flat surface 58 which bears against the roller 20, as shown by the broken lines 60. When the roller 20 is inserted in the pocket, the spring 54 is bent toward its corresponding bar 26. The spring, thereafter, may exert a circumferential force against the rollers 20 at two longitudinally spaced areas 62 and 64 on the roller 20. If the roller is not pushed back that far, only the area 62 on the roller will be in contact with the spring.

I claim:

1. A retainer for an overrunning clutch comprising: a first molded plastic rim; a second molded plastic rim axially spaced from the first rim and having an inside diameter at least equal to the outside diameter of the first rim; a plurality of circumferentially spaced molded plastic bars interconnecting the two rims forming roller pockets; and a molded plastic spring connected to each of a plurality of the bars at a point adjacent the second rim and extending angularly from the second rim toward the first rim; the rims, bars, and springs being one integral member with each spring being adapted to be pressed toward its corresponding bar when a roller is placed in the corresponding pocket of the retainer so that each spring exerts a force against the corresponding roller.

2. A retainer in accordance with claim 1 wherein: the outer diameter of the first rim is less than the inner diameter of the second rim; and each spring is integral with both its corresponding bar and the second rim.

3. A retainer in accordance with claim 2 wherein: the inside diameters of the springs are at least equal to the outside diameter of the first rim.

4. A retainer in accordance with claim 3 wherein: each spring is adapted to exert a circumferential force against the longitudinal center portion of the corresponding roller.

5. A retainer in accordance with claim 3 wherein each spring is adapted to exert a circumferential force on the corresponding roller along substantially the entire length of the spring.

6. A retainer in accordance with calim 3 wherein: the spring is adapted to exert a force against two longitudinally spaced areas on the corresponding roller.

* * * * *